United States Patent [19]

Yamada et al.

[11] Patent Number: 4,808,484

[45] Date of Patent: Feb. 28, 1989

[54] PEELABLE PROTECTIVE FILM

[75] Inventors: Kunio Yamada; Kohzoh Miyazaki, both of Chiba; Yoshitaka Oowatari, Saitama; Yoshio Egami; Toshio Honma, both of Kanagawa, all of Japan

[73] Assignees: Sumitomo Chemical Co., Ltd., Osaka; Japan Butyl Co., Ltd., Kanagawa, both of Japan

[21] Appl. No.: 89,455

[22] Filed: Aug. 26, 1987

[51] Int. Cl.$^4$ ............................................. B32B 27/30
[52] U.S. Cl. .................................... 428/522; 524/562; 524/230
[58] Field of Search ................ 524/562, 230; 428/522

[56] References Cited

U.S. PATENT DOCUMENTS

| | | | |
|---|---|---|---|
| 3,510,448 | 5/1970 | Byler et al. | 524/562 |
| 4,320,038 | 3/1982 | Keogh | 524/562 |
| 4,444,935 | 4/1984 | Miller et al. | 524/562 |
| 4,713,411 | 12/1987 | Kanou et al. | 524/562 |

Primary Examiner—Edith Buffalow
Attorney, Agent, or Firm—Sughrue, Mion, Zinn, Macpeak & Seas

[57] ABSTRACT

A peelable protective film is disclosed, which is processed from a composition comprising 100 parts by weight of an ethylene/methyl methacrylate copolymer, from 0.01 to 0.1 part by weight of an inorganic filler, and from 0.01 to 1.0 part by weight of a slip agent. The protective film of the invention, when wrapped around articles having a tacky surface, exhibits good adhesion to the substrate and has a low peeling strength and, therefore, can be readily peeled away as required.

3 Claims, No Drawings

PEELABLE PROTECTIVE FILM

FIELD OF THE INVENTION

The present invention relates to a peelable protective film made from a composition comprising an ethylene/methyl methacrylate copolymer.

BACKGROUND OF THE INVENTION

Peelable protective films are used to protect rubber, metal, plastic, or other articles so that their surfaces are not contaminated, scatched, corroded, or otherwise damaged during their shipment and storage. After they have served their purpose, they can be readily peeled away from the substrate.

Peelable protective films of the type described above are conventionally made of polyvinyl- or polyolefin-based polymers such as polyvinyl chloride, high-density polyethylene, low-density polyethylene, polypropylene, and ethylene/vinyl acetate copolymers.

Japanese Patent Publication No. 45974/83 describes a polyolefin-based peelable protective film made of an ethylene/1-butene random copolymer. Further, Japanese Patent Publication No. 47993/84 proposes an invention of a dual layered film formed of a layer of a mixture of an ethylene/ethyl acrylate copolymer and an ethylene/vinyl acetate copolymer and a layer of a polyolefin. The films disclosed in the above-referenced patents are chiefly intended to protect the surfaces of metal articles, and the property that is principally required of these films is good adhesion to the substrate.

In the case that substrates to be protected have tackiness or adhesion as in rubber articles, there have been proposed methods in which the substrates themselves are coated with antiblocking compositions such as hydrocarbon-based resin compositions or anionic or nonionic surfactants (see Japanese Patent Publication Nos. 10860/76 and 50047/77 and Japanese Patent Application (OPI) No. 78945/77). The term "OPI" as used herein means "unexamined published application." However, there have been no reports at all that a film per se is used as a protective film having good peelability to such tacky substances. Therefore, one has had to be satisfied with use of low-density polyethylene films or other films as a protective film of, e.g., a rubber veil, though they are poor in peelability.

SUMMARY OF THE INVENTION

An object of the present invention is to provide a protective film which not only has good adhesion to tacky substances such as rubber articles but also can be readily peeled away from a substrate to be protected.

This object of the present invention can be attained by a peelable surface protective film made from a composition comprising 100 parts by weight of an ethylene/methyl methacrylate copolymer, from 0.01 to 0.1 part by weight of an inorganic filler, and from 0.01 to 1.0 part by weight of a slip agent.

DETAILED DESCRIPTION OF THE INVENTION

The ethylene/methyl methacrylate copolymer which is used in the present invention can be prepared by radical copolymerization of ethylene and methyl methacrylate in the presence of a free radical-initiator such as an organic peroxide or oxygen. The copolymerization between ethylene and methyl methacrylate is typically carried out at a temperature of from 130° to 300° C. and at a pressure of from 500 to 3,000 kg/cm$^2$.

The ethylene/methyl methacrylate copolymer used in the present invention preferably has a methyl methacrylate content of from 5 to 20 wt%. If the methyl methacrylate content is less than 5 wt% or exceeds 20 wt%, the resulting film has such strong adhesion to, for example, a block-like butyl rubber that its peeling strength is high, whereby the peelability is not improved. The ethylene/methyl methacrylate copolymer used in the present invention preferably has a melt flow rate of from 0.1 to 20 g/10 min, more preferably from 0.5 to 10 g/10 min. Melt flow rate is an important factor for processing a composition into a film. If the melt flow rate of the ethylene/methyl methacrylate copolymer is less than 0.1 g/10 min, the molten composition has such a high viscosity that it imposes an excessive load on the motor for driving an extruder. If the melt flow rate of the ethylene/methyl methacrylate copolymer exceeds 20 g/10 min, the formed film causes a sag phenomenon, deteriorates in terms of efficiency of handling, and has a low mechanical strength.

A film processed from the copolymer of ethylene and methyl methacrylate can be prepared by any molding methods in which the copolymer is melt extruded through an extruder to form a molten resin in the thin film-like state, which is then solidified by quenching. A preferred method is, however, a blown molding or T-die molding method. The molding temperature is typically within the range of from the melting point of the ethylene/methyl methacrylate copolymer to 300° C. and preferably from 120° to 250° C.

The protective film of the present invention must contain from 0.01 to 0.1 part by weight of an inorganic filler, particularly a fine particulate inorganic filler having an average particle size of no more than 10 μm, and from 0.01 to 1.0 part by weight of a slip agent based on 100 parts by weight of the ethylene/methyl methacrylate copolymer. Examples of the fine particulate inorganic filler are silica, feldspar, zeolite, talc, and kaolinite. Examples of the slip agent are organic amides or esters, with organic amides being preferred. Among them, saturated fatty acid amides and unsaturated fatty acid amides or bis-fatty acid amides are particularly preferable. The slip agent is incorporated into the protective film of the present invention so as to impart good slipperiness to the films to be loaded and packed after being used for wrapping rubber articles or the like, to thereby ensure efficient loading operation and smooth recovery of the articles during unpacking operation.

In order to ensure good stability of the composition at the film processing, conventionally employed antioxidants such as 2,6-di-t-butyl-4-hydroxytoluene, stearyl-β-(3,5-t-butyl-4-hydroxyphenyl)propionate, tetrakis[methylene-3-(3′,5′-di-t-butyl-4-hydroxyphenyl)propionate]methane, tetrakis(2,4-di-t-butylphenyl)-4,4′-biphenylene diphosphonite, and bis(2,4-di-t-butylphenyl)pentaerythritol diphosphite may be incorporated in the protective film of the present invention.

The film processed from the composition of the present invention is used for the surface protection or adhesion prevention of rubber substances. Examples of such rubber substances are vulcanized or unvulcanized products of natural rubbers, synthetic rubbers (e.g., styrene/butadiene rubber, butyl rubber, ethylene/propylene rubber, polybutadiene rubber, isoprene rubber, chloroprene rubber, and nitrile rubber), and mixtures of these rubbers.

The film of the present invention comprising an ethylene/methyl methacrylate copolymer has not only an advantage of easy peelability but also an advantage that it can be used in plants of manufacturing rubber articles without introducing any modification to the existing packaging facilities.

The following Examples and Comparative Examples are provided for the purpose of further illustrating the present invention but are in no sense to be taken as limiting.

EXAMPLE 1 AND COMPARATIVE EXAMPLES 1 TO 3

The peeling strength of various resin films with respect to BP®-1066 (a butyl rubber of Japan Butyl Co., Ltd.) was measured. The resin samples used were: Acryft® CM 2001 (an ethylene/methyl methacrylate copolymer of Sumitomo Chemical Co., Ltd.); Sumikathene® F101-1 (low-density polyethylene of Sumitomo Chemical Co., Ltd., which is produced by high pressure-method); Evatate® F1103-1 (an ethylene/vinyl acetate copolymer of Sumitomo Chemical Co., Ltd.); and Unicar® EEA 6170 (an ethylene/ethyl acrylate copolymer of Nippon Unicar Co., Ltd.). Acryft® CM 2001 was modified by incorporation of 2,000 ppm of silica as the fine particulate organic filler and 2,000 ppm of oleic acid amide as the organic amide.

Each of the resin samples was formed into a film of 30 μm in thickness with a blown film processing machine (50 mmφ; made by Modern Machinery Company) at a blowup ratio of 1.8. The film processing temperatures used are indicated in Table 1.

The peelability of resin films from butyl rubber in the block form can be evaluated on the actual products but may be determined more conveniently by the following method.

Convenient Peeling Test (1) Preparation of Butyl Rubber Sample

About 60 g of a butyl rubber sample is passed several times through a roll kneader (surface temperature: about 150° C.) so as to form a rubber sheet having a thickness of about 4 mm.

This rubber sheet is sandwiched between polyester films and compressed to a thickness of about 2 mm with a hot press at 150° C.

The rubber sheet held between the polyester films is left to cool on a flat table and cut into cubes having a length of 150 mm on one side.

(2) Bonding Resin Film to Butyl Rubber Sample

The polyester film on one side of the butyl rubber sample prepared in (1) is peeled away, and a resin film to be tested is lightly attached to the same side of the sample. The assembly is compressed by passing through rollers so that no wrinkle or separation between layers takes place. The assembly is then sandwiched between glass layers and held in an oven at 80° C. for 2 hours while applying a load of 10 kg. Thereafter, the assembly is taken out of the oven and left to cool.

(3) Peeling Test

Each sample prepared in (2) is cut into a size of 25 $mm^W$ and 150 $mm^L$. The adhesion strength between the rubber sheet and each test resin film is measured with a tensile tester at a tensile speed of 300 mm/min.

The results of measurements of peeling strength by the procedures described are shown in Table 1.

TABLE 1

|  | Example 1 | Comparative Example 1 | Comparative Example 2 | Comparative Example 3 |
| --- | --- | --- | --- | --- |
| Resin | Acryft ® CM 2001 | Sumikathene ® F101-1 | Evatate ® F1103-1 | Unicar ® EEA 6170 |
| Comonomer and Content | methyl methacrylate (10 wt %) | none | vinyl acetate (5 wt %) | ethyl acrylate (18 wt %) |
| Melt Flow Rate (g/10 min) | 2 | 0.3 | 0.5 | 6 |
| Processing Temperature (°C.) | 140 | 160 | 160 | 130 |
| Peeling strength (g/25 mm) | 165 | 450 | 480 | 500 |

EXAMPLES 2 TO 8

As in Example 1, films were processed from Acryft® CK 1004, CM 2001, CM 4005, CM 4006, CM 4001, CM 4004, and CM 5007, all being an ethylene/methyl methacrylate copolymer by Sumitomo Chemical Co., Ltd., and subjected to the peeling test. The results are shown in Table 2.

Not only CM 2001 but also other copolymers were modified by incorporating 2,000 ppm of silica as the fine particulate organic filler and 2,000 ppm of oleic acid amide as the organic amide.

TABLE 2

|  | Example No. | | | | | | |
| --- | --- | --- | --- | --- | --- | --- | --- |
|  | 2 | 3 | 4 | 5 | 6 | 7 | 8 |
| Resin (Acryft ®) | CK 1004 | CM 2001 | CM 4005 | CM 4006 | CM 4001 | CM 4004 | CM 5007 |
| Methyl Methacrylate Content (wt %) | 5 | 10 | 10 | 15 | 18 | 20 | 25 |
| Melt Flow Rate (g/10 min) | 0.5 | 2 | 7 | 7 | 7 | 20 | 20 |
| Processing | 160 | 140 | 130 | 130 | 130 | 120 | 120 |

TABLE 2-continued

| | Example No. | | | | | | |
|---|---|---|---|---|---|---|---|
| | 2 | 3 | 4 | 5 | 6 | 7 | 8 |
| Temperature (°C.) | | | | | | | |
| Peeling Strength (g/25 mm) | 250 | 165 | 200 | 210 | 220 | 280 | 410 |

EXAMPLE 9 AND COMPARATIVE EXAMPLES 4 TO 6

A peeling test was conducted in order to evaluate the adhesion strength between Esprene ® EP-567 (an ethylene/propylene rubber of Sumitomo Chemical Co., Ltd.) and each of the resin films used in Example 1 and Comparative Examples 1 to 3. The test results are summarized in Table 3.

TABLE 3

| | Example 9 | Comparative Example 4 | Comparative Example 5 | Comparative Example 6 |
|---|---|---|---|---|
| Resin | Acryft ® CM 2001 | Sumikathene ® F101-1 | Evatate ® F1103-1 | Unicar ® EEA 6170 |
| Comonomer and Content | methyl methacrylate (10 wt %) | none | vinyl acetate (5 wt %) | ethyl acrylate (18 wt %) |
| Melt Flow Rate (g/10 min) | 2 | 0.3 | 0.5 | 6 |
| Processing Temperature (°C.) | 140 | 160 | 160 | 130 |
| Peeling strength (g/25 mm) | 20 | 700 | 670 | 540 |

The peelable protective film of the present invention is processed from a composition comprising 100 parts by weight of an ethylene/methyl methacrylate copolymer, from 0.01 to 0.1 part by weight of an inorganic filler, and from 0.01 to 1.0 part by weight of an organic amide. When wrapped around articles having a tacky surface such as rubber articles, the film exhibits good adhesion to the substrate and has a low peeling strength and, therefore, can be readily peeled away as required.

While the invention has been described in detail and with reference to specific embodiments thereof, it will be apparent to one skilled in the art that various changes and modifications can be made therein without departing from the spirit and scope thereof.

What is claimed is:

1. A peelable protective film processed from a composition comprising 100 parts by weight of an ethylene/methyl methacrylate copolymer, from 0.01 to 0.1 part by weight of an inorganic filler, and from 0.01 to 1.0 part by weight of a slip agent.

2. A peelable protective film according to claim 1, wherein said ethylene/methyl methacrylate copolymer has a methyl methacrylate content of from 5 to 20 wt%.

3. A peelable protective film according to claim 1, wherein said ethylene/methyl methacrylate copolymer has a melt flow rate of from 0.1 to 20 g/10 min.

* * * * *